United States Patent
Morris, Jr.

[15] 3,702,049
[45] Nov. 7, 1972

[54] DEVICE FOR CLEANING POLLUTED AIR

[72] Inventor: Ewel J. Morris, Jr., 901 West Walnut Street, Sylacauga, Ala. 55150

[22] Filed: Sept. 24, 1970

[21] Appl. No.: 75,048

[52] U.S. Cl. .....................55/278, 55/387, 55/514, 55/520
[51] Int. Cl. ...........................B01d 46/40
[58] Field of Search.....................55/278, 387–390, 55/512–515, 520, 521, 524; 210/483; 210/483

[56] References Cited

UNITED STATES PATENTS

| | | |
|---|---|---|
| 3,638,403 | 2/1972 | Delacour et al. ............55/389 |
| 3,664,095 | 5/1972 | Asker et al. ................55/387 |
| 2,038,071 | 4/1936 | Wilhelm ......................55/278 |
| 3,611,678 | 10/1971 | Holden........................55/387 |
| 2,973,828 | 3/1961 | Engle............................55/278 |
| 2,979,157 | 4/1961 | Clark............................55/387 |

*Primary Examiner*—Tim R. Miles
*Assistant Examiner*—Vincent Gifford
*Attorney*—Jennings, Carter & Thompson

[57] ABSTRACT

Device for cleaning polluted air wherein decontaminant granules anchored in adjacent surfaces of sheets extending alongside and spaced from each other. Deformations in adjacent surfaces receive adjacent portions of granules and retain outer portions of granules in air passageway between adjacent surfaces.

1 Claim, 7 Drawing Figures

PATENTED NOV 7 1972 3,702,049
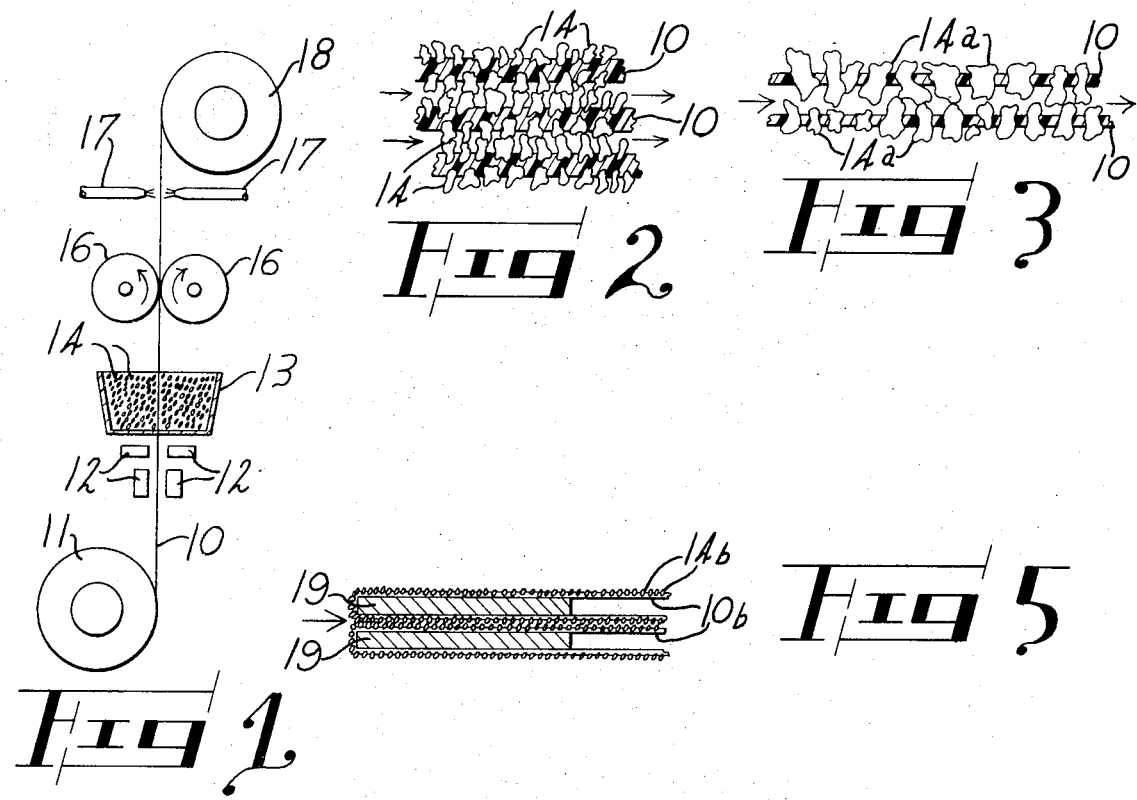
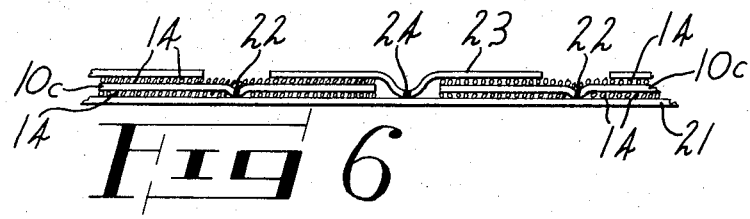
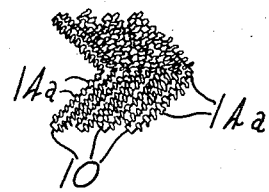
INVENTOR.
Ewel J. Morris, Jr.
BY Jennings, Carter & Thompson
Attorneys

DEVICE FOR CLEANING POLLUTED AIR

BACKGROUND OF THE INVENTION

This invention relates to a device for cleaning polluted air and more particularly to such a device which shall be adapted to remove harmful pollutants, such as sulphur dioxide and carbon monoxide, which requires the treatment of a large volume of air.

Heretofore in the art to which my invention relates, difficulties have been encountered in removing harmful pollutants from large volumes of air due to the fact that the air mixed with the pollutant gas should come in direct contact with the decontaminant without having to contact other materials placed in the path of movement of the air being treated. It has been difficult to employ reactants that remove or change pollutant gases due to the fact that the reactants are themselves delicate and can become polluted or pollute each other. Accordingly, the reactants must be pure and unhampered and remain virile to be effective. While activated carbon has been employed to absorb or react with pollutant gases, such as sulphur dioxide, no effective means has been provided for installing the activated carbon in a treating device whereby the activated carbon remains clean until contacted by the pollutant gases. The use of adhesives, such as glue or gum are unsatisfactory due to the fact that they stop up the pores of the carbon and upon drying these adhesives, moisture or fumes are given off which in turn pollute the carbon.

BRIEF SUMMARY OF INVENTION

In accordance with my present invention, I employ improved means for retaining the decontaminant granules in the path of air to be treated and at the same time offers a minimum of resistance to the flow of air. The decontaminant granules are partially enclosed or encased in the surface of a sheet or film whereby the effective part of the granule projects outwardly of the surface whereby the granules are firmly held in place and properly distributed for effective removal of pollutants. The granules are not wet or immersed in the material forming the sheet, such as plastic, and the granules are not exposed to harmful vapors or gases during the assembly of the device. Two sheets of the material carrying the decontaminant are placed adjacent each other to define an air passageway therebetween whereby the air being treated flows into direct contact with the decontaminant granules as it passes between adjacent sheets.

Apparatus and filter devices embodying features of my invention are shown on the accompanying drawing, forming a part of this application in which:

FIG. 1 is a diagrammatic view showing apparatus for embedding the decontaminant granules into a plastic film;

FIG. 2 is an enlarged, fragmental, sectional view showing adjacent sheets of plastic material having the decontaminant granules embedded therein;

FIG. 3 is a fragmental, sectional view showing a modified form of my invention wherein the granules penetrate the sheets or mesh of plastic material;

FIG. 4 is a sectional view showing a modified form of my invention;

FIG. 5 is a sectional view showing another modification;

FIG. 6 is a fragmental, sectional view showing a further modified form of my invention; and, FIG. 7 is a sectional view showing a further modification.

Referring now to the drawing for a better understanding of my invention, I show in FIG. 1 apparatus for embedding the decontaminant granules into a sheet or film 10 of plastic material. The film is delivered from a feed roll 11 through heating units 12 which heat the film 10 until the outer surface thereof is soft and tacky. In actual practice, I find that suitable sheets or film 10 in the form of polyethylene or polypropylene are satisfactory in every respect.

From the heating units 12, the film 10 passes through a receptacle 13 filled with heated granules of a decontaminant, which may be mixed with particles of the same plastic and carbon fibers, such as activated carbon in the form of charcoal. Also, the decontaminant granules may be in the form of granules which change carbon monoxide to carbon dioxide, such as Hopcalite. As is well known in the art to which my invention relates, Hopcalite consists of a mixture of metallic oxides, largely manganese dioxide and cupric oxide, with the addition of cobalt and silver oxides, which catalyzes the oxidation of carbon monoxide at ordinary temperatures and is used in gas masks and ventilating systems. The decontaminant granules may also be in the form of an alkali, such as soda ash or marble chips.

As the heated surface or surfaces of the film 10 pass through the receptacle 13, the granules, indicated at 14 adhere or stick to the heated film. Where the particles of plastic are mixed with the granules, when heated, they fuse themselves together and to the film and carbon fibers to form a lattice on the side next to the film, to help hold the granules more firmly together. The temperature of the film may be varied from approximately 180° to 800° F. That is, the sheet or film 10 is heated to a temperature that will soften the sheet and at the same time will not deteriorate or distort the film or granules. Where it is desired to coat only one side of the film 10, only one side of the container 13 is filled with the decontaminant granules 14 and the film is heated only on that side by the heat units 12.

Upon removal from the container 13, the film passes between cylinder rolls 16 which have soft pliable surfaces to press the decontaminant granules 14 into the film 10 whereby the granules are not crushed. Immediately upon leaving the cylinder rollers 16, the film is cooled by cool air delivered by conduits 17 whereby the plastic material forming the film 10 is cooled to fix the granules 14 within the sheet or film 10, as shown in FIG. 2. The quick cooling prevents the sheet or film 10 from giving off gases which might be absorbed by the decontaminant granules 14. That is, the process is carried out at a speed whereby only the surface of the film is softened for reception of the adjacent portions of the decontaminant granules 14.

Preferably, the release coat on the plastic film 10 is removed before heating the film and applying the granules 14 thereto. That is, a release coat is sometimes placed on films of plastic materials to make them release from the forming machine and not stick on the roll. The film 10 may be a single sheet, a coated film or a laminate of high melting point film in the center or on one side, with a low melting point film on the side to be embedded with the decontaminant granules.

From the cooling unit 17, the sheet or film of plastic material 10 having the granules 14 embedded therein pass around a take-up roll 18, as shown in FIG. 1. From the take-up roll 18, the sheet or film 10 may be placed in various type devices for use whereby the air to be treated passes between adjacent sheets of material so that the air moves into direct contact with the decontaminant granules whereby a minimum of resistance to the flow of air is encountered.

In FIG. 2 of the drawing, I show a plurality of sheets of plastic material 10 having the decontaminant granules 14 embedded in both surfaces of each sheet 10. The sheets 10 are positioned with adjacent surfaces thereof extending alongside and spaced from each other to define an air passageway between adjacent sheets 10, as shown in FIG. 2. Also, as shown in FIG. 2, as the granules 14 are pressed into the soft sheet of material 10, deformations are formed in the surfaces of the sheet for receiving adjacent portions of the granules 14 whereby upon cooling, the granules are firmly embedded and fixed within the plastic sheet 10 with the outer portions of the granules 14 in the path of movement of air between adjacent sheets 10. The decontaminant granules are of a size ranging from 2 to 500 microns. Preferably, the decontaminat granules are small so as to present a maximum surface area for absorbing pollutant gases.

In FIG. 3 of the drawing, I show a modified form of my invention in which adjacent sheets 10 carry decontaminant granules 14a which are pressed all the way through the sheets. That is, by filling only one side of the compartments 13 and applying sufficient pressure by the press rollers 16, the granules 14a are pressed all the way through the plastic film 10 to present outer surfaces of the granules 14a at each side of each sheet 10 which are in position to be contacted by the air to be treated as it passes between adjacent sheets 10.

In FIG. 4 of the drawing, I show another form of my invention in which a plurality of plastic sheets 10 having the decontaminant particles 14a embedded therein are positioned in a chevron shape. As the air to be treated passes between adjacent sheets 10, it contacts the outer surfaces of the decontaminant granules 14a.

In FIG. 5 I show another form of my invention in which decontaminant granules 14b are embedded in only one side of plastic sheets 10b. The sheets 10b pass around elongated bar-like members 19 with the free ends of the sheets 10b extending downstream from the direction of flow of the air between adjacent sheets 10b. The bar-like members 19 are anchored to retain them in the position shown as a single fold of the flexible sheet 10b, coated with the granules of decontaminant 14b, is placed over each bar-like member so that the air being treated passes through the space defined between adjacent sheets 10b. The free ends of the sheets 10b form streamer flaps which bring about turbulance and better contact of the air being treated with the decontaminant granules as the air passes in one direction only through the passageway between adjacent sheets 10b.

In FIG. 6 I show another modified form of my invention which is particularly adapted for use in protective clothing. A series of strips of plastic material 10c are secured to the article of clothing indicated at 21 by suitable means, such as by sewing at 22 whereby adjacent ends of the strips 10c are spaced from each other. Between each pair of adjacent strips 10c secured to the clothing 21, additional strips of plastic material 23 are secured to the article of clothing 21 by sewing as at 24. Both sides of the strips of plastic material 10c carry the embedded decontaminant particles 14 whereby air passing between the strip 10c and the strip 23 contact the decontaminant granules prior to moving through the fabric forming the article of clothing 21. Also, any air passing between the under surface of the strips 10c and the outer surface of the article of clothing 21 also contact the decontaminant granules 14. It will be apparent that additional strips of material 10c and 23 may be employed where it is desired to cause the air being treated to pass into contact with a plurality of layers of decontaminant granules.

In FIG. 7 of the drawing, I show a further modified form of my invention in which a continuous sheet of plastic material 10 in the form of a roll carries decontaminant granules 14a. The air being treated is passed between adjacent sheets 10 or in a direction transverse to the sheets 10 whereby the air contacts the decontaminant granules 14 projecting from adjacent sheets 10 forming the overall spiral pattern.

From the foregoing, it will be seen that I have devised an improved device for cleaning pollutant air. By anchoring the decontaminant granules in the outer surface of the plastic sheets of material, the decontaminant granules are not contaminated during installation of the apparatus due to the fact that there are no adhesives or fumes which block pores or reduce the efficiency of the decontaminant granules. By providing deformations in adjacent surfaces corresponding to and receiving the adjacent portions of the granules, the granules are retained in fixed positions with outer portions thereof in the path of movement of the air being treated. Preferably, thermoplastic sheets are employed whereby only the outer surfaces thereof are softened to a temperature below the temperature at which the decontaminant granules deteriorate. Accordingly, the contours of the deformation formed in the surfaces of the sheets of plastic material correspond to the contours of the adjacent portions of the decontaminant granules, thus forming a positive bond between the granules and the sheet. Also, by cooling the sheet of plastic material immediately after the decontaminant granules are embedded therein, I not only fix the adjacent portions of the granules within the sheets but also remove excess granules which are not embedded in the sheet. Furthermore, by positively securing the decontaminant granules to the sheet without the application of other securing means, such as glues, adhesives and the like, the air being treated contacts only the exposed portions of the granules, thus increasing the efficiency of operation.

While I have described the granules as being embedded by applying heat to the sheet or film of plastic material, it will be apparent that a softening agent may be employed, with or without heat, such as a solvent for the film. However, the softening agent must be a material which will not give off volatiles that would fill the pores in the granules or have a deleterios affect thereon. Preferably, the softening agent is a non fuming material such as a powdered alkali or acid.

While I have shown my invention in several forms, it will be obvious to those skilled in the art that it is not so limited, but is susceptible of various other changes and modifications without departing from the spirit thereof.

What I claim is:

1. A device for cleaning polluted air comprising:
   a. at least two sheets of plastic material extending around and supported by transverse bar-like members with adjacent surfaces thereof extending alongside and spaced from each other to define an air passageway therebetween and with adjacent free ends of said sheets extending downstream of said bar-like members as viewed in the direction of air flow between said sheets,
   b. decontaminant granules in said air passageway between said adjacent surfaces of said sheets, and
   c. there being deformations in said adjacent surfaces receiving and attaching adjacent portions of said granules to said adjacent surfaces and retaining the outer portions of said granules in the path of movement of air between said adjacent surfaces.

* * * * *